March 9, 1954 — P. C. ZUMBUSCH — 2,671,431

PRESSURE FLUID OPERATED CONTROL APPARATUS

Filed May 3, 1951 — 3 Sheets-Sheet 1

PETER C. ZUMBUSCH
INVENTOR.

BY

March 9, 1954      P. C. ZUMBUSCH      2,671,431
PRESSURE FLUID OPERATED CONTROL APPARATUS
Filed May 3, 1951      3 Sheets-Sheet 2

PETER C. ZUMBUSCH
INVENTOR.

BY

Patented Mar. 9, 1954

2,671,431

UNITED STATES PATENT OFFICE 2,671,431

PRESSURE FLUID OPERATED CONTROL APPARATUS

Peter C. Zumbusch, Upper Montclair, N. J.

Application May 3, 1951, Serial No. 224,404

9 Claims. (Cl. 121—38)

This invention relates to a hydraulically operated positioning device for conveying positioning signals to a lever at a point remote from the point where the positioning signals are initiated.

In small power crafts or motor driven boats wherein the motor is positioned below the deck it has been found desirable to provide for the lever control of the clutch, a means for operating said lever control remote therefrom and adaptable for easy manual control from the cockpit.

The present invention contemplates a hydraulically operated positioning device for such lever control which is remotely operated by means of a plurality of valves or by a valve having a plurality of outlet, inlet, and return openings therein whereby the desired lever position may be obtained.

Accordingly, it is an object of the present invention to provide a hydraulically operated positioning device to control a lever remote from the point where the positioning signals are given.

It is an object of the present invention to provide a positioning device wherein novel opposingly mounted double pistons are hydraulically moved to control the lever movement of the lever being operated.

It is another object of the present invention to provide a plurality of valves or a single valve which may be operated by a single hand lever for directing the hydraulic fluid to the positioning device and to coact with the double pistons therein for operating the said device.

With these and other objects in view, as may appear from the accompanying specification, the invention consists of various features of construction and combination of parts, which will be first described in connection with the accompanying drawings, showing a hydraulically operated means for conveying positioning signals of a preferred form embodying the invention, and the features forming the invention will be specifically pointed out in the claims.

While the present invention will be described in connection with a clutch lever, it will be understood that the positioning device can be utilized to control any lever at a point remote from the point where the positioning signals originate.

Positioning device

Figure 1:
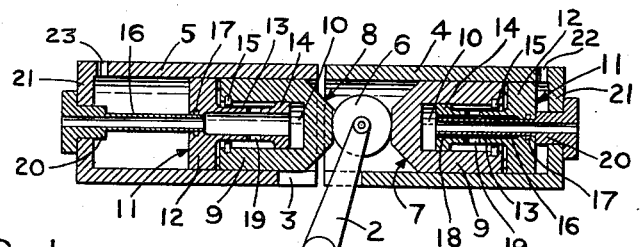
Figure 1 is a cross-section of the positioning device in the ahead position.
Figure 2:
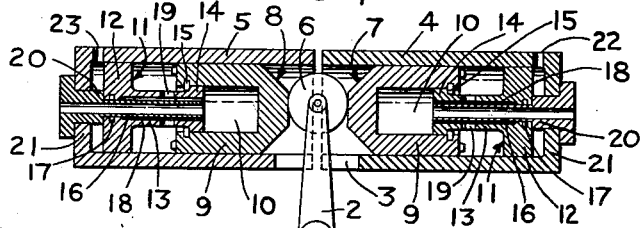
Figure 2 is a cross-section of the positioning device in the stop position.
Figure 3:
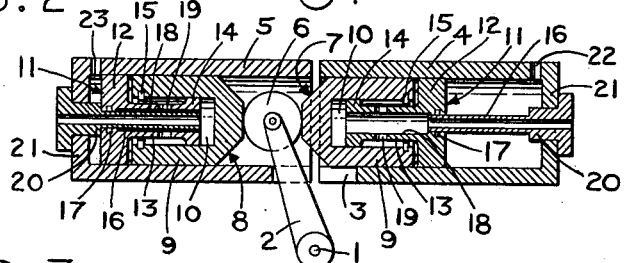
Figure 3 is a cross-section of the positioning device in the astern position.

Referring to the drawings, Figures 1, 2 and 3 show a clutch shaft 1 fixedly connected to one end of an operating lever 2. The other end of the lever 2 extends through an opening 3 formed in the axial line of two opposingly mounted cylinders 4 and 5 so that it lies perpendicularly to the said axial line inside the cylinders 4 and 5. A roller member 6 is connected to the said end of the lever 2 lying inside the cylinders 4 and 5 and will be contacted on either side by piston structures 7 and 8 slidably mounted in the cylinders 4 and 5.

Piston structures 7 and 8 are identical in construction and differ only in that they act opposingly with respect to the roller member 6 during operation of the positioning device.

Thus the piston structures 7 and 8 comprise slidably mounted primary pistons 9 substantially cylindrical in shape having cylindrical chambers or bores 10 in the axial lines thereof opening to the rear of each of said primary pistons 9, and secondary pistons 11 slidably mounted rearwardly of said primary pistons 9 in said cylinders 4 and 5 by means of annular bases 12.

The secondary pistons 11 are provided with cylindrical projections 13 which extend outwardly from said annular bases 12 for movement into and out of said cylindrical chambers or bores 10 of the primary pistons. The cylindrical projection 13 is of such length that when the secondary pistons 11 are moved forwardly the annular bases 12 will abut against the rear face of its respective primary piston 9 and to prevent the secondary pistons 11 from slipping out of said chambers or bores 10 on rearward movement of said secondary pistons or on forward movement of said primary pistons relative to each other, annular shoulders 14 are provided on the forward ends of said secondary pistons which will abut against stop members 15 adjacent the mouth of the chambers or bores 10, as is clearly shown in Figures 1, 2 and 3 of the drawings.

The secondary pistons 11 are also adapted to be slidably mounted about the outer surface of stationary feed tubes 16 connected to the ends of the respective cylinders 4 and 5, by means of bearing surfaces 17 formed in the annular bases 12 at the rearward end of bores 18 formed in said secondary pistons 11 along the axial line thereof.

The stationary feed tubes 16 supply or drain hydraulic fluid, to and from the spaces formed by the chambers or bores 10, to operate the primary pistons 9 and secondary pistons 11 of the positioning device. Relief openings 19 are provided in the walls of each of the cylindrical projections 13 of the secondary pistons 11 for equalization of pressure on movement of the primary pistons 9 and secondary pistons 11 relative to each other, all of which is clearly shown in Figures 1, 2 and 3.

The stationary feed tubes 16 are provided with annular stop shoulders 20 to prevent the piston structures 7 and 8 from moving into abutment with the rear walls 21 of the cylinders 4 and 5. Suitable ports 22 and 23 are provided at this rearward portion of the cylinders 4 and 5 respectively just forward of the rear walls 21 to provide combined supply and drain means for operating the piston structures 7 and 8 as hereinafter to be described.

Figure 6:
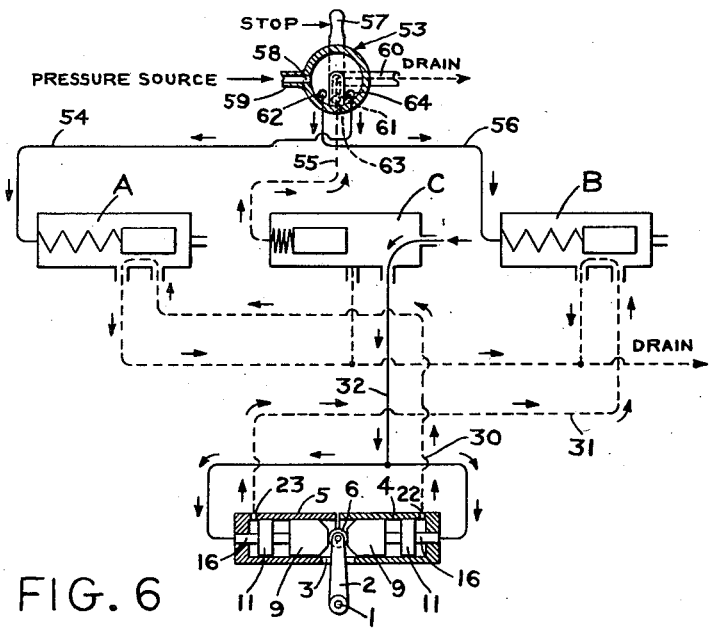
Figures 5, 6 and 7 are diagrammatic sketches showing the coaction between the valves and the positioning device in the ahead, stop and astern positions.
Figure 5:
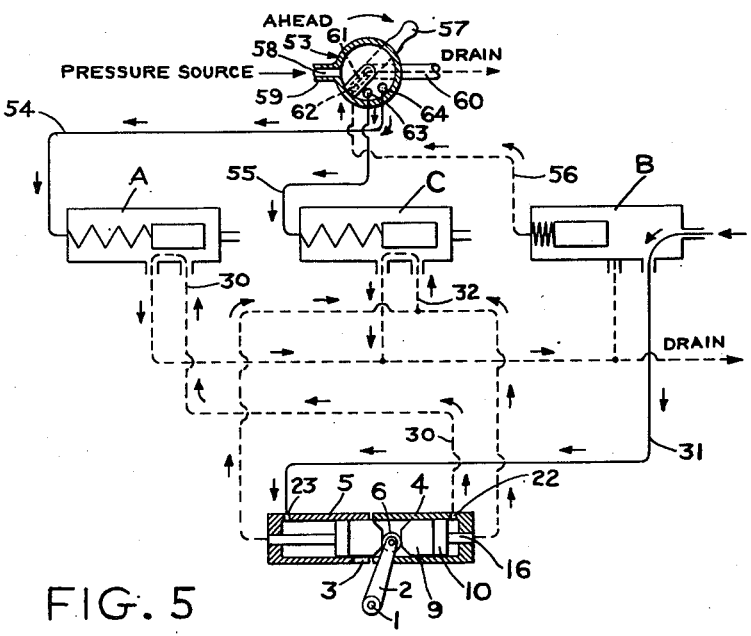
Figure 7:
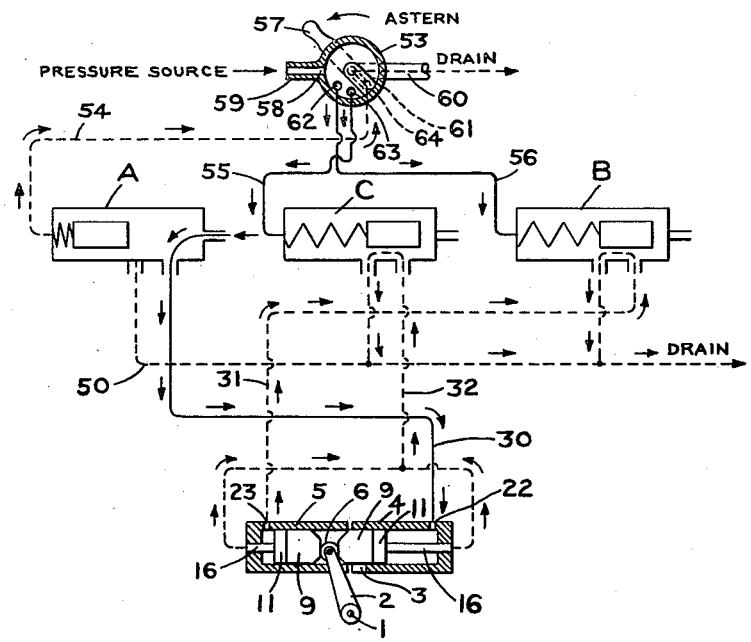

In order to operate the positioning device, Figures 5, 6 and 7 show diagrammatically valve A connected by means of conduit 30 to port 22, valve B connected by means of conduit 31 to port 23, and valve C connected by means of conduit 32 which divides to each of the stationary feed tubes 16.

The valves A, B and C are identical in construction and differ only insofar as they are connected to either the stationary feed tubes 16 or the ports 22 and 23 on the positioning device.

*Valve construction*

Figure 4:
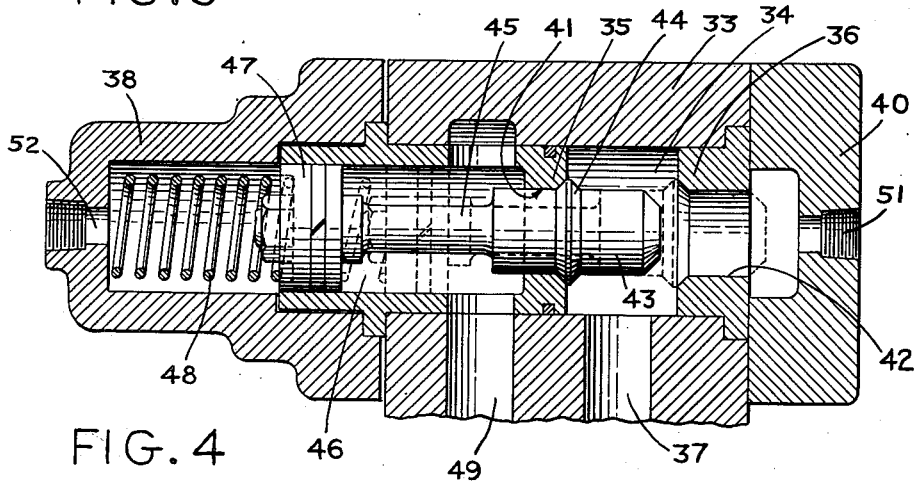
Figure 4 is a cross section through one of the valve members utilized for controlling the flow of fluid to the positioning device.

Accordingly, Figure 4 of the drawings shows a typical valve of the preferred form which includes a valve body 33 having a valve chamber 34 formed by a bore extending through said valve body having a first valve seat 35 mounted in one end of said bore and a second valve seat 36 mounted in the other end thereof in spaced relationship to said first valve seat 35. A valve outlet 37 is provided on each of said valves which provides communication between the respective valve chambers 34 formed therein and the respective conduits 30, 31 and 32 connecting said valves A, B and C to the ports 22 and 23 and the feed tubes 16.

The first valve seat 35 will be held in position by a hollow substantially conical shaped end portion 38 which will abut against a flange 39 in the valve seat 35 and be connected by any suitable means in a fluid tight relationship with said valve body 33.

Similarly the second valve seat 36 will be held in position by a valve cover 40 which is also connected by any suitable means in fluid tight relationship with valve body 33.

Each of said valve seats 35 and 36 are provided with valve guide bores as at 41 and 42 respectively, in which a valve guide 43 is slidably mounted for movement from one to the other thereof. The valve guide 43 is provided with a double faced valve head 44 adapted to be seated in either the first valve seat 35 or the second valve seat 36 as the valve guide slides from one valve guide bore to the other, across the valve chamber 34, as is clearly shown in Figure 4 of the drawings.

Connected to each valve guide 43 is a valve stem 45 which extends along the longitudinal line of said first valve seat 35 through a cylindrical chamber 46 formed therein to a valve piston 47 mounted for sliding movement in said cylindrical chamber 46. The valve piston 47 will normally be forced into said cylindrical chamber 46 by a spring member 48 mounted in said hollow conical end portion 38 which abuts against the outer portion of the valve piston 47 whereby the valve head 44 is normally maintained against the second valve seat 36 as indicated by the phantomized lines in Figure 4 of the drawings.

When the valve head 44 is seated against the second valve 36, the cylindrical chamber 46 will communicate with the valve chamber 34 through the bore 41. Outlet port 49 provided for the cylindrical chamber 46 which connects and drains to the hydraulic fluid reservoir (not shown) by means of conduit 50 will allow fluid in the lines 30, 31 and 32 to pass into the valve chamber through the bore 41 into the cylindrical chamber 46 and thence to the hydraulic fluid reservoir (not shown) through the outlet 44 and conduit 50.

The valves A, B and C, will allow pressure fluid from some suitable type of pressure source such as a rotary pump or the like (not shown) taking its suction from a reservoir and having its discharge connected to each of said valves to pass to the positioning device by means of a pressure fluid inlet 51 which communicates with the bore 42 in the second valve seat 36. This pressure fluid would normally force the valve head 44 off of the valve seat 36, however a combined inlet and drain port 52 is provided at the conical end portion 38, into which pressure fluid may be passed from a manual operated valve 53 through conduits 54, 55 or 56 depending on the position of the manual lever 57 thereon as will be hereinafter described whereby the pressure fluid will act to balance off the pressure fluid acting to enter through the pressure inlet port 51.

*Manual control valve*

The manual control valve 53 has substantially cylindrical housing with an inlet 58 for pressure fluid from some suitable type of pressure source such as a rotary pump or the like (not shown) taking its suction from a reservoir and discharging the same into a conduit 59 connected to the inlet 58. The housing is also provided with a drain 60 which communicates with a hollow channel 61 in the manual lever 57.

In order to pass the pressure fluid through the manual control valve 53, to the valves A, B or C, control valve outlets 62, 63 and 64 are provided which communicate with the respective conduits 54, 56 and 55 in turn connected to the valves A, B and C, all of which is clearly shown in Figures 5, 6 and 7 of the drawings.

*Operation*

In operation when it is desired to move the clutch lever to the ahead position as shown diagrammatically in Figure 5, the manual lever 57 is moved by hand to the ahead position. This will connect the control valve outlet 62 to the hollow channel 61 of the manual lever 57 so that fluid will drain from the inlet drain port 52 in the conical end portion 38 on valve B through the conduit 56 to the outlet 62 and thence through the hollow channel 61 through the drain 60 to the fluid reservoir.

Since the pressure fluid at inlet port 51 on the valve B will no longer be balanced the valve head 44 will be moved off of seat 36 in valve B to allow pressure fluid to pass through the bore 42 to the valve chamber 34. From valve chamber 34 it passes through outlet 37 through the conduit 31 and port 23 to the rear portion of cylinder 5 to act on the secondary piston 11 therein of piston structure 8.

The secondary piston 11 will be moved into abutment with the primary piston 9 forcing any fluid in the chamber or bore 10 thereof out through the stationary feed tube 16 and the pressure fluid will continue to move the both pistons outwardly of said cylinder 5. As the pistons 9 and 11 are moved outwardly they will abut against the roller 6 on the lever 2, moving them to the ahead position.

However, since the roller will abut against the piston structure 7 in cylinder 4 the piston structure will in turn be forced rearwardly, primary piston 9 and secondary piston 11 in cylinder 4 being forced into abutment so that fluid in the chamber or bore 10 is forced outwardly through the stationary feed tubes 16. Similarly as the piston structure 7 is forced rearwardly in cylinder 4 fluid will be forced out of port 22 into conduit 30, all of which is clearly shown in Figures 1 and 5 of the drawings.

As above described conduits 30 and 32 are connected to the drain through the cylindrical chamber 46 of the respective valves A and C and accordingly hydraulic fluid will pass to the reservoir (not shown) as long as the pressure fluid passing through control valve outlets 63 and 64, conduits 54 and 55 and the combined inlet and drain port 52 of the respective valves A and C continues to act against the respective valve pistons 47 as this enables the spring member 48 to hold the valve head 44 and the second seat 36. As a result of this no back pressure will be acting against the movement of piston structure 8 in cylinder 5 and as long as the pressure fluid continues to act against the piston structure 7 it will remain in the position shown in Figure 5 wherein the lever 2 is moved to the ahead position.

Figure 6 shows the stop position, wherein control outlet 63 in the manual control valve 53 is brought into communication with the hollow channel 61 of the manual lever 57 when it is moved to the stop position. This causes fluid to drain from the combined inlet and drain port 52 in the conical end portion 38 on the valve C through the conduit 55 to the outlet 63 and then through the hollow channel 61 through the drain 60 to the reservoir (not shown).

Since the pressure fluid acting at inlet 51 in the valve B will no longer be balanced the valve head 44 thereof will be moved off of seat 36 in valve B to allow pressure fluid to pass to the valve chamber 34 thereof and thence through outlet 37 to the conduit 32 which divides and passes the hydraulic pressure fluid through the stationary feed tubes 16 to the chambers or bores 10 in the primary piston 9 of the respective piston structures 7 and 8.

The pressure fluid acts to force the secondary piston 11 and primary pistons 9 of the respective piston structures 7 and 8 away from each other until the secondary pistons 11 are moved against the stop shoulders 20 of the stationary feed tubes 16, and the primary pistons 9 are balanced equally, as is clearly shown in Figure 2 of the drawings.

Conduits 30 and 31 connected to ports 22 and 23 will receive hydraulic fluid therein as the secondary pistons 11 are moved rearwardly in their respective cylinders 4 and 5 by the pressure fluid in the chambers or bores 10. The fluid in conduits 30 and 31 will pass to drain through their respective valves A and B as above described as long as pressure fluid from the manual control valve 53 passes through control outlets 62 and 64, conduits 54 and 56 to the combined inlet and drain ports 52 of the respective valves A and B to act therein against the valve pistons 47 of the respective valves A and B for holding the valve heads 44 thereof on their respective seats 36.

As long as the pressure fluid continues to act no back pressure will be created to change the position of the piston structures 7 and 8 and the lever 2 will therefore be held in a substantially vertical position as is shown in Figure 6 of the drawings.

Figure 7 shows the ahead position wherein control outlet 64 in the manual control valve 53 is brought into communication with the hollow channel 61 of the manual lever 57. Pressure fluid will drain from the control valve A through conduit 54 and control outlet 64 through the hollow channel 61 of the manual lever 57 to drain 60 and thence to the fluid reservoir (not shown).

The valve head 44 of valve A will be moved off its valve seat 36 by the action of pressure fluid through inlet 51 and pressure fluid will pass through the valve chamber 34 of the valve A to the outlet 37 thereof and conduit 30 connected to the outlet 37 through port 22 into the cylinder 4 where it will expand against the rearmost portion of the secondary piston 11 of piston structure 7 forcing it outwardly of the cylinder 4 into abutment with the primary piston 9 of piston structure 7.

As the secondary piston 11 is forced into abutment with the primary pistons 9 of the piston structure 7 fluid will be forced outwardly of the chamber or bore 10 in the primary piston 9 of piston structure 7 through the stationary feed tube 16.

Pressure fluid will continue to move the piston structure 7 outwardly of cylinder 4 into abutment with the roller 6 which in turn abuts and moves the piston structure 8 in the cylinder 5. As this occurs primary piston 9 of piston structure 8 is brought into abutment with secondary piston 11 thereof forcing the fluid in the chamber or bore 10 in the primary piston 9 of the piston structure 8 through the stationary feed tube 16.

The piston structure 7 will continue to move the roller 6 and accordingly the lever 2 until the secondary piston 16 of the piston structure 8 in cylinder 5 is brought into contact with the stop shoulders 20 on the stationary feed tube 16. This will be the astern position as is clearly shown in the Figures 3 and 7 of the drawings.

Conduits 32 and 31 connected to the stationary feed tubes and port 23 respectively will allow fluid to drain through the respective valves B and C to which they are connected thus preventing back pressure. As long as pressure fluid acts on the valve pistons 47 of the respective valves B and C through the control outlets 62 and 63 and conduits 55 and 56 connecting the valves B and C to the said control outlets as above described, all of which is clearly shown in Figure 7 of the drawings.

It is believed obvious that in the event of hydraulic breakdown by placing the manual lever 57 in the stop position the operator will be able to manipulate the clutch lever 2 manually by direct contact.

It will be understood that the invention is not to be limited to the specific construction or arrangement of parts shown, but that they may be widely modified within the invention defined by the claims.

What is claimed is:

1. Means including a source of pressure fluid for positioning a lever at a point remote from the point where the positioning signals originate comprising, a hydraulically operated positioning device including, spaced cylinders about one end of said lever, a primary piston independently disposed in each of said cylinders for sliding movement in opposite directions with respect to said lever and adapted to abut and move said lever, a secondary piston slidably mounted in each of said cylinders to coact with said primary pistons for moving said lever, and ports and passages in said cylinders communicating with said pistons, valves connected to each of the ports and passages to direct flow of pressure fluid from the source thereof to the cylinders for operating said primary and secondary pistons, and a control valve receiving pressure fluid independently from said source of pressure fluid and connected to each of said valves provided with an operating lever for initiating positioning signals by controlling flow of said independent supply of pressure fluid to and away from at least one of said valves at a time to operate said valves.

2. Means including a source of pressure fluid for positioning a lever at a point remote from the point where the positioning signals originate comprising, a hydraulically operated positioning device including, spaced cylinders about one end of said lever, a primary piston independently disposed in each of said cylinders for sliding movement in opposite directions with respect to said lever and adapted to abut and move said lever, a secondary piston slidably mounted in each of said cylinders coaxially with the respective primary piston therein and to coact with said primary piston for moving said lever, and ports and passages in said cylinders communicating with said pistons, valves connected to each of the ports and passages to direct flow of pressure fluid from the source thereof to the cylinders for operating said primary and secondary pistons, and a control valve receiving pressure fluid independently from said source of pressure fluid and connected to each of said valves provided with an operating lever for initiating positioning signals by controlling flow of said independent supply of pressure fluid to and away from at least one of said valves at a time to operate said valves.

3. Means including a source of pressure fluid for positioning a lever at a point remote from the point where the positioning signals originate comprising, a hydraulically operated positioning device including, spaced cylinders about one end of said lever, primary pistons slidably mounted in said cylinders in opposing relationship with respect to said lever and adapted to abut and move said lever, a bore formed in the axial line of each of said pistons, stationary feed tubes mounted on the rear walls of said cylinders and extending along the axial line in communication with said bores, a secondary piston slidably mounted in each of said cylinders about said stationary feed tubes and provided with a lateral projection adapted to move into and out of the bore of its respective primary piston when the primary and secondary pistons move relatively to each other, and an inlet and drain port for each of said cylinders, valves for each of said ports and a valve for said stationary feed tubes to direct flow of pressure fluid from the source to the cylinders and the respective bores for operating said primary and secondary pistons, and a control valve receiving pressure fluid independently from said source of pressure fluid and connected to each of said valves provided with an operating lever for initiating positioning signals by controlling of said independent supply of pressure fluid to and away from at least one of said valves at a time to operate said valves.

4. In a means for positioning a lever at a point remote from the point where the positioning signals originate as claimed in claim 3 wherein said lateral projections include relief means to relieve pressure in said bore during movement of said primary and secondary pistons relative to each other comprising, transverse passages, and an annular axial passage communicating with said transverse passage adjacent the stationary feed tube and opening into its respective bore.

5. In a means for positioning a lever at a point remote from the point where the positioning signals originate as claimed in claim 3 wherein means are provided to control the lateral movement of said primary and secondary pistons and said secondary pistons with respect to said primary piston including, a stop means at the mount of each of said bores, an annular shoulder adjacent the end of said lateral projection adapted to contact said stop means when the secondary pistons are moved to their outermost position with respect to their respective primary pistons, and a stop shoulder formed on the rear wall of said cylinders to abut the secondary pistons to stop rearward movement of said pistons.

6. Means including a source of pressure fluid for positioning a lever at a point remote from the point where the positioning signals originate comprising, a hydraulically operated positioning device including, spaced cylinders about one end of said lever, primary pistons slidably mounted in said cylinders in opposing relationship with respect to said lever and adapted to abut and move said lever, a bore formed in the axial line of each of said pistons, stationary feed tubes mounted on the rear walls of said cylinders and extending along the axial line in communication with said bores, a secondary piston slidably mounted in each of said cylinders about said stationary feed tubes and provided with a lateral projection adapted to move into and out of the bore of its respective primary piston when the primary and secondary pistons move relatively to each other, and an inlet and drain port for each of said cylinders, valves for each of said ports and a valve for said stationary feed tubes to direct flow of pressure fluid from the source to the cylinders and the respective bores for operating said primary and secondary pistons, and a control valve including, an inlet for receiving pressure fluid independently from said source of pressure fluid, outlets communicating with each of said valves, a drain for returning pressure fluid from said control valve to said source, and an operating lever on said control valve for initiating positioning signals and having means for connecting at least one of said outlets at a time to said drain for controlling flow of pressure fluid to and away from the valves to operate said valves.

7. In a means for positioning a lever at a point remote from the point where the positioning signals originate as claimed in claim 6 wherein said means in the operating lever includes a hollow channel having one end communicating with said drain and the other end open to communicate with each of said outlets on movement of said operating lever.

8. Means including a source of pressure fluid for positioning a lever at a point remote from the point where the positioning signals originate comprising, a hydraulically operated positioning device mounted about one end of said lever and having means therein for operatively positioning said lever, ports and passages in said positioning device communicating with said means, valves for each of said ports and passages, each of said valves having, a valve chamber, an inlet port for said valve chamber communicating directly with said pressure source, an outlet port for said valve chamber connected to its respective port or passage, a second chamber in said valve communicating with said valve chamber by means of a transverse bore, to drain operating fluid back to said pressure source from said means, spaced valve seats for said inlet port and said transverse bore respectively, a valve head having a double face, a valve guide for said valve head connected to a valve stem and piston slidably mounted in said second chamber, resilient means engaging said piston for normally maintaining one of said faces on the valve head in engagement with said valve seat for the inlet port, and an inlet and drain port communicating with said valve stem and piston mounted in the second chamber, and a control valve including, an inlet for receiving pressure fluid independently from said source of pressure fluid, outlets communicating with the inlet and drain ports of each of the respective valves, a drain for returning pressure fluid from said control valve to said source, and an operating lever on said control valve for initiating positioning signals and having means for connecting at least one of said outlets at a time to said drain for controlling flow of pressure fluid to and away from the valve to operate said valves.

9. Means including a source of pressure fluid for positioning a lever at a point remote from the point where the positioning signals originate comprising, a hydraulically operated positioning device including, spaced cylinders about one end of said lever, primary pistons slidably mounted in said cylinders in opposing relationship with respect to said lever and adapted to abut and move said lever, a bore formed in the axial line of each of said pistons, stationary feed tubes mounted on the rear walls of said cylinders and extending along the axial line in communication with said bores, a secondary piston slidably mounted in each of said cylinders about said stationary feed tubes and provided with a lateral projection adapted to move into and out of the bore of its respective primary piston when the primary and secondary pistons move relatively to each other, and an inlet and drain port for each of said cylinders, valves for each of said ports and a valve for said stationary feed tubes to direct flow of pressure fluid from the source to the cylinders and the respective bores for operating said primary and secondary pistons, a valve chamber, an inlet port for said valve chamber communicating directly with said pressure source, an outlet port for said valve chamber connected to its respective port or passage, a second chamber in said valve communicating with said valve chamber by means of a transverse bore to drain operating fluid back to said pressure source from said means, spaced valve seats for said inlet port and said transverse bore respectively, a valve head having a double face, a valve guide for said valve head connected to a valve stem and piston slidably mounted in said second chamber, resilient means engaging said piston for normally maintaining one of said faces on the valve head in engagement with said valve seat for the inlet port, and an inlet and drain port communicating with said valve stem and piston mounted in the second chamber, and a control valve including, an inlet for receiving pressure fluid independently from said source of pressure fluid, outlets communicating with the inlet and drain ports of each of the respective valves, a drain for returning pressure fluid from said control valve to said source, and an operating lever on said control valve for initiating positioning signals and having means for connecting at least one of said outlets at a time to said drain for controlling flow of pressure fluid to and away from the valve to operate said valves.

PETER C. ZUMBUSCH.

References Cited in the file of this patent

UNITED STATES PATENTS

| Number | Name | Date |
| --- | --- | --- |
| 715,291 | Potter | Dec. 9, 1902 |
| 1,952,806 | Hyland | Mar. 27, 1934 |
| 2,234,009 | Robinson | Mar. 4, 1941 |
| 2,401,197 | Simpson | May 28, 1946 |
| 2,524,488 | Stevens | Oct. 3, 1950 |

FOREIGN PATENTS

| Number | Country | Date |
| --- | --- | --- |
| 625,711 | Great Britain | July 1, 1947 |